H. K. WOOD.
LOW POTENTIAL ELECTRICAL SYSTEM AND METHOD OF CHARGING SAME.
APPLICATION FILED NOV. 23, 1917.
1,361,432.
Patented Dec. 7, 1920.
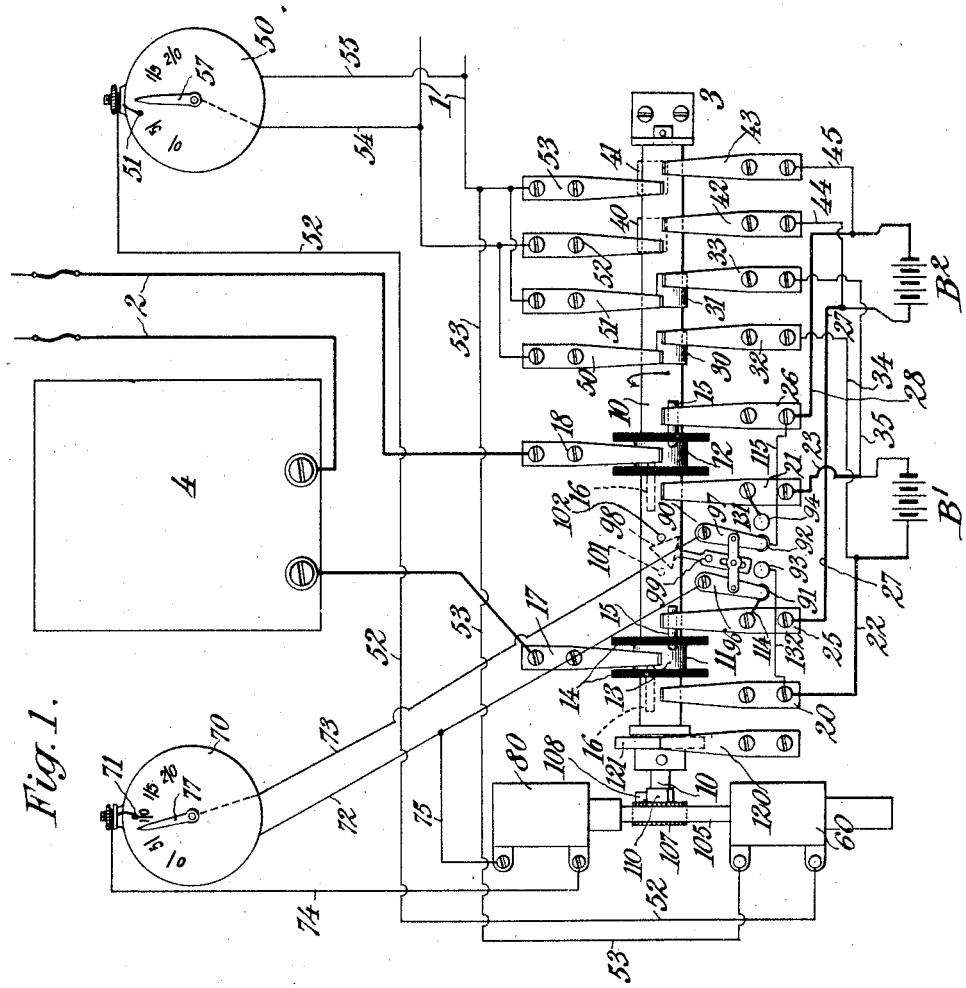
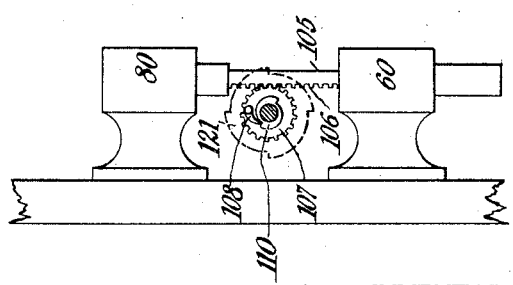
INVENTOR :
Hubert K. Wood,
By Attorneys,
WITNESSES:

UNITED STATES PATENT OFFICE.

HUBERT K. WOOD, OF BAYSIDE, NEW YORK, ASSIGNOR TO ELECTRIC FLASHER COMPANY, OF NEW YORK, N. Y., A CORPORATION OF NEW YORK.

LOW-POTENTIAL ELECTRICAL SYSTEM AND METHOD OF CHARGING SAME.

1,361,432. Specification of Letters Patent. Patented Dec. 7, 1920.

Application filed November 23, 1917. Serial No. 203,549.

*To all whom it may concern:*

Be it known that I, HUBERT K. WOOD, a citizen of the United States of America, residing in Bayside, Long Island, in the county of Queens and State of New York, have invented certain new and useful Improvements in Low-Potential Electrical Systems and Methods of Charging Same, of which the following is a specification.

This invention relates to improvements in low potential electrical systems, such as house bell systems, telephone systems—receiving their charge from a higher potential system, such as the ordinary 110 or 220 volt electric lighting system in general use, and to a method of charging low potential systems from higher potential systems, and aims to provide improvements therein.

For many years efforts have been made to provide a low potential system combined with a higher potential system, as the ordinary lighting system, in such manner that all liability of the higher voltage of the higher voltage system being introduced upon the low potential system will be avoided, and in practice to provide such a system as will pass the requirements of the electrical authorities of the various municipalities and of the National Board of Fire Underwriters.

The present invention provides a system and method wherein the low potential system may be energized by a higher potential system and all liability of introducing an excessive voltage on the low potential system avoided.

The invention also provides a system and method wherein the operation of the parts may be automatic.

The invention also provides a system and method wherein the current consumed in the high potential system may be proportional to the consumption of current in the low potential system. The invention also provides a system wherein the low potential circuit may be maintained supplied with current even when short circuits occur in the low potential circuit or portions thereof.

Other features of the invention will be hereinafter set forth.

An embodiment of the system is illustrated in the accompanying drawing. The system also serves for carrying out the method.

In said drawings,—

Figure 1 is an illustration, mostly diagrammatic, of the system;

Fig. 2 is a side elevation of certain switch-operating electromagnets shown in Fig. 1.

Referring to the drawings, numeral 1 designates a low potential circuit, as, for example, a house bell circuit, and numeral 2 designates the leads of a higher potential circuit, as, for example, an ordinary 110 volt lighting circuit.

A plurality of storage batteries are employed, here represented as two, $B^1$ and $B^2$.

Numeral 3 designates, as a whole, a switch arrangement or device for connecting one of the storage batteries to the low potential circuit 1, and for connecting one of the other storage batteries to the higher potential system 2, during the interval, or during a part of the interval, that said storage battery is disconnected from the low potential circuit.

Any suitable rheostat 4 is inserted in the higher potential circuit 2 for cutting down the voltage to the proper amount for charging the storage batteries.

Any suitable arrangement or device for connecting one storage battery to the low potential circuit, and excludes the connection of said storage battery to any part of the higher potential system while the storage battery is connected to the low potential circuit, and which connects another storage battery to the higher potential system for charging, and excludes any connection of said storage battery to the low potential system while charging, may be used in carrying out the invention.

A suitable and preferred form of switch arrangement is shown in the accompanying drawings. Said switch may comprise a rotatable shaft 10 having thereon conducting parts 11 and 12. The shaft 10 is preferably of insulating material, as ebonite. These conducting parts comprise metallic bushings 13, insulating barriers 14, and metallic pins 15 and 16 respectively. Upon these conducting parts 11 and 12 rub brushes 17 and 18, the leads 2 of the high potential or lighting circuit being connected to the brushes 17 and 18.

20 and 21 designate a pair of brushes connected to the storage battery B¹ through the conductors 22, 23, and 25, 26 designate a pair of brushes connected to the storage battery B² through the conductors 27, 28. The pairs of brushes 20, 21, and 25, 26, are adapted to make contact with the pins 15 and 16 of the conducting parts 11 and 12 at suitable times, the arrangement, however, preferably being such that one storage battery is connected to the high potential charging circuit at a time.

The rotatable shaft 10 also preferably has thereon a number of pairs of conducting segments corresponding to the number of storage batteries used. As here shown, the shaft 10 has thereon a pair of conducting segments 30, 31, and a pair of conducting segments 40, 41, the pair of segments 30, 31, being connectible to a storage battery B¹ through brushes 32, 33 and conductors 34, 35. The conducting segments 40, 41 are connectible to the storage battery B² through the brushes 42, 43 and the conductors 44, 45.

50, 51, and 52, 53, designate pairs of brushes in multiple with the low potential circuit 1. The brushes 50, 51 are adapted to bear upon the segments 30, 31 in conjunction with the brushes 32, 33, and the brushes 52, 53 are adapted to bear upon the conducting segments 40, 41 in conjunction with the brushes 42, 43.

The arrangement of the various parts is such that when the high potential circuit is connected to one of the storage batteries for charging, the other storage battery is entirely cut off from the high potential circuit, and such that one of the batteries not undergoing charge is wholly disconnected from the charging circuit and connected to the low potential circuit.

As shown in the accompanying drawings, battery B² is being charged, the charging being effected from the high potential circuit 2, through the brushes 17, 18, conducting parts 11 and 12 (through the pins 15), brushes 25 and 26, and conductors 27 and 28. The circuit between the high potential circuit 2 and the battery B¹ is broken at the brushes 20, 21.

The battery B¹ is connected to the bell circuit through the conductors 34, 35, brushes 32, 33, conducting segments 30, 31, and the brushes 50, 51. The battery B² is disconnected from the low potential circuit through the brushes 42, 43, these bearing upon the insulating part of the shaft 10.

By turning the shaft 10 in the direction of the arrow, the circuit from the high potential circuit to the battery B² may be broken (so that the battery B² may be at rest), while the battery B¹ remains connected to the bell circuit through the conducting segments 30, 31. This will be the preferred method of operation, inasmuch as the length of time for charging a battery will usually be less than the length of time the battery is discharging.

Or, the shaft 10 may be given such a rotation as will break the connection of the storage battery B² at the pins 15, 15, and establish connection of the battery B¹ with the high potential circuit 2 through the pins 16, 16 and the brushes 20, 21. At the same time the connection of the battery B¹ with the low potential circuit 1 will be broken at the segments 30, 31, and the battery B² (now disconnected from the charging circuit) connected to the low potential circuit 1 through the brushes 42, 43, the segments 40, 41, and brushes 52, 53.

It is preferable, however, to have the rotation of the shaft 10 effected automatically. This automatic rotation of the shaft 10 may be effected in any manner desired. The shaft is preferably given an intermittent rotation, and its rotation is preferably effected in accordance with the condition of charge of the storage battery which is furnishing current to the low potential circuit. The rotation is also preferably effected in accordance with the condition of charge of the storage battery being charged.

In the low potential circuit there is arranged any suitable device responsive to the charged condition of the storage battery connected to the low potential circuit, as a voltage relay 50.

The relay 50 has a contact 51 corresponding to a condition of the storage battery connected to the low potential circuit where it is desired to disconnect the storage battery and connect another more fully charged storage battery to the low potential circuit. The relay 50 serves to connect a solenoid 60, through suitable conductors 52 and 53, to the low potential circuit, whereby the solenoid 60 may be energized by current in the low potential circuit.

54, 55 designate leads connecting the voltage relay 50 with the low potential circuit 1. When, therefore, the movable member 57 of the relay 50 makes contact with the contact 51, the solenoid 60 is energized and the shaft 10 rotated, as will be described hereinafter.

Suitable means responsive to the condition of charge of the batteries being charged, are provided for turning the shaft 10.

As here shown, there is provided a voltage relay 70, a single relay 70 being made to serve for each of the storage batteries, as will be hereinafter described.

The relay 70 is provided with a contact 71 corresponding with the condition of the battery being charged, at which it is desired to disconnect the battery from the charging circuit.

80 designates a solenoid for actuating the shaft 10, adapted to be connected to the circuit of the battery being charged, through the relay 70. Conductors 72, 73 connect the relay 70 with the battery being charged, through a suitable switch device 90. The relay 70 is connected with the solenoid 80 through conductors 74 and 75.

The switch 90 is adapted to connect the relay 70 with each of the storage batteries being charged. The switch comprises a pair of contacts 91, 92, and a pair of contacts 93, 94. The contacts 91, 92 are connected to the brushes 25, 26, which are in turn connected to the storage battery $B^2$, and the contacts 93, 94 are connected to the brushes 20, 21, which are in turn connected to the brushes 20, 21 connected to the storage battery $B^1$. The switch 90 also comprises a pair of arms 96, 97, and a lever 98, pivoted at 99, for shifting the arms 96, 97 to one or other of the pairs of contacts 91, 92, and 93, 94. The shifting of the arms 96, 97 of the switch 90, may be effected by pins 101, 102 on the shaft 10, these pins 101, 102 striking upon first one side and then the other of the lever 98, and correspondingly shifting the arms 96, 97 of the switch 90.

The operation of the means for automatically rotating the shaft 10 will now be described.

When the battery $B^2$, which is connected with the charging circuit 2 through the brushes 25 and 26, has become fully charged, its potential rising to, say, 10 volts, the movable member 77 of the voltage relay 70 makes contact with the contact 71, thereby admitting current to the solenoid 80 from the brushes 25 and 26, the circuit being made through the conductor 114, contact 91, the switch arm 96, conductor 72, conductor 75, solenoid 80, conductor 74, contact 71, movable member 77 of the relay 70, conductor 73, switch arm 97, contact 92, and conductor 115.

When the solenoid 80 is energized it pulls the armature 105 a distance upward sufficient to turn the gear wheel 107 which meshes with a rack 106 upon the armature 105, a quarter revolution. The gear wheel 107 has a pawl 108 thereon, and this pawl 108 engages with a two-toothed ratchet wheel 110 fixed upon the shaft 10. The movement of the armature 105 by the solenoid 80 therefore causes the pawl 108 to move the ratchet wheel 110 a quarter revolution, this quarter revolution of the ratchet wheel 110 rotating the shaft 10 sufficiently to break the circuit between the high potential circuit 2 and the battery $B^2$ at the brushes 25, 26, and the pins 15 of the conducting parts 10, 11. When the circuit is broken the solenoid 80 is deënergized and the armature 105 drops to its lowermost position. A spring pawl 120 coöperating with a four-toothed ratchet wheel 121 fixed upon the shaft 10 serves to maintain the shaft 10 in the angular position to which it has been moved by the solenoid. The battery $B^1$ remains connected to the low potential circuit 1. When so much of the charge of the battery $B^1$ has been used that its potential falls to, say, eight volts, the movable member 57 of the voltage relay 50 makes contact with the contact 51. Current is thereupon admitted from the low potential circuit 1 to the solenoid 60, as follows: conductor 54, movable member 57, contact 51, conductor 52, solenoid 60, and conductor 53. When the solenoid 60 is energized the armature 105 is pushed upwardly a distance sufficient to cause the rack 106 to turn the gear wheel 107 a half revolution. Inasmuch, however, as the solenoid 80 has previously acted to turn the ratchet wheel 110 a quarter revolution, the first part of the movement of the gear wheel 107 and pawl 108 carried thereby, under the action of the solenoid 60, is idle, and the ratchet wheel 110 is hence turned but a quarter revolution by the solenoid 60.

When the shaft 10 is turned by the solenoid 60, as just described, battery $B^1$ is disconnected from the bell circuit and connected to the charging circuit through the brushes 20, 21, and pins 16 of the conducting parts 11 and 12. Battery $B^2$, which has been charged and has been at rest, is connected to the low potential circuit 1 through brushes 32, 33, conducting segments 30, 31, and brushes 50, 51.

At the same time the pin 102 strikes against one side of the lever 98 and throws the arms 96 and 97 of the switch 90 onto the contacts 93, 94, thus connecting the voltage relay 70 with the battery $B^1$ undergoing charge, through conductors 131, brush 21, and conductor 23, and through conductor 132, brush 20 and conductor 22.

If a condition should arise in the low potential circuit, as, for example, the occurrence of a short circuit which used up the charge of the battery connected to the low potential circuit, prior to the time that the relay 80 had acted to turn the shaft 10 a quarter revolution it is desirable to turn the shaft in such manner as to cut out the storage battery which had run down, and to immediately connect the charged or partially charged battery with the low potential circuit.

Such an operation may be accomplished by the system described.

If, referring to Fig. 1, the battery $B^1$ should become so discharged that the relay 50 should operate prior to the relay 80 connected to the battery $B^2$ undergoing charge, the current supplied by the relay 50 to the solenoid 60 would energize the solenoid 60 to move the armature 105 a distance sufficient to turn the gear wheel 107 a half revolution, and the pawl 108 on the gear wheel 107 would thereupon move the ratchet wheel 110 a half revolution. This half revolution of the ratchet wheel 110 would move the shaft 10 so as to disconnect the battery B¹, as hereinbefore described, from the low potential circuit, disconnect the battery B² from the high potential charging circuit, and immediately connect the battery B² to the low potential circuit 1, as hereinbefore described. The run-down battery B² would be at the same time connected with the charging circuit 2, as hereinbefore described.

The method of charging will be apparent from the foregoing description of the system.

The inventive ideas are capable of other mechanical expressions than those herein illustrated and specifically described. For example, other means might be used for rotating the shaft 10, instead of the relays. The invention is not limited to the use of two or more storage batteries, but is considered to include means whereby an equivalent mode of operation may be attained.

What is claimed is:—

1. A low potential system, comprising a low potential circuit, a high potential circuit connection, a plurality of storage batteries, and switching means for successively making the circuit between said high potential circuit and a storage battery disconnected from said low potential circuit, said switching means also successively connecting said low potential circuit with a storage battery, which is disconnected from said high potential circuit, and means responsive to conditions of the battery connected to the low potential circuit for automatically operating said switching means.

2. A low potential system, comprising a low potential circuit, a high potential circuit connection, a plurality of storage batteries, and switching means for successively making the circuit between said high potential circuit and a storage battery disconnected from said low potential circuit, said switching means also successively connecting said low potential circuit with a storage battery, which is disconnected from said high potential circuit, and means responsive to conditions of the battery connected to the lower potential circuit, and also to the battery being charged for automatically operating said switching means.

3. A low potential system, comprising a low potential circuit, a high potential circuit connection, a plurality of storage batteries, and switching means for successively making the circuit between said high potential circuit and a storage battery disconnected from said low potential circuit, said switching means also successively connecting said low potential circuit with a storage battery, which is disconnected from said high potential circuit, and means for operating said switching means, said switching means being adapted to disconnect the battery being charged, without disconnecting the battery connected to the low potential circuit.

4. A low potential system comprising a low potential circuit, a high potential circuit connection, a plurality of storage batteries, means for connecting one storage battery disconnected from said high potential circuit connection to the low potential circuit, and connecting another of said storage batteries disconnected from said low potential circuit connection to said high potential circuit connection, and means for automatically actuating said connecting and disconnecting means, said means operating to cut out a battery connected to the charging circuit without disconnecting the battery connected to the low potential circuit under normal conditions, and operating under a run-down condition of the battery connected to the low potential circuit to cut out said last named battery from the low potential circuit and to cut out said battery connected to the charging circuit and connect it in circuit with said low potential circuit.

5. A low potential system comprising a low potential circuit, a high potential circuit connection, a plurality of storage batteries, means for connecting one storage battery disconnected from said high potential circuit connection to the low potential circuit, and connecting another of said storage batteries disconnected from said low potential circuit connection to said high potential circuit connection, and means for automatically actuating said connecting and disconnecting means, said means comprising electrical mechanism connected to a battery being charged for operating said means to disconnect said battery being charged from the high potential charging circuit, and said means comprising electrical mechanism in the low potential circuit for actuating said means to disconnect the battery connected to said low potential circuit and to connect a charged battery to said low potential circuit.

6. A low potential system comprising a low potential circuit, a high potential circuit connection, a plurality of storage batteries, means for connecting one storage battery disconnected from said high potential circuit connection to the low potential circuit, and connecting another of said storage batteries disconnected from said low potential circuit connection to said high potential circuit connection, and means for automatically actuating said connecting and disconnecting means, said means comprising electrical mechanism adapted to be connected to a battery being charged for operating said means to disconnect said battery being charged from the high potential charging circuit, and said means comprising electrical mechanism in the low potential circuit for actuating said means to disconnect the battery connected to said low potential circuit and to connect a charged battery to said low potential circuit, and means for shifting said electrical mechanism from connection with one battery being charged to another.

7. A method of supplying energy to a low potential circuit from a high potential circuit comprising charging a storage battery while disconnected from the low potential circuit, disconnecting said charged battery from the charging circuit, and connecting it to the low potential circuit when another battery connected to said low potential circuit is discharged to a predetermined extent, and while said battery is connected to the low potential circuit charging said other battery while disconnected from the low potential circuit, and disconnecting said last stated storage battery from the charging circuit and connecting it to the low potential circuit when said first named battery has discharged to a predetermined extent, the battery first connected to the low potential circuit being disconnected and so repeating the cycle.

In witness whereof I have hereunto signed my name.

HUBERT K. WOOD.